United States Patent Office 2,913,451
Patented Nov. 17, 1959

2,913,451

IODOPHENYLAMIDOALKANESULFONIC ACID COMPOUNDS

George B. De La Mater, St. Johns, Mo., assignor to Mallinckrodt Chemical Works, St. Louis, Mo., a corporation of Missouri No Drawing. Application April 4, 1957
Serial No. 650,577

4 Claims. (Cl. 260—211)

This invention relates to new and useful sulfonic acid derivatives and more particularly to certain novel iodophenylalkanesulfonic acid derivatives.

Briefly, the present invention is directed to compounds having the formula:

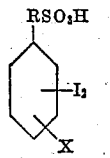

where R is a lower alkylene radical selected from the group consisting of methylene, polymethylene, substituted methylene and substituted polymethylene and X is a substituent selected from the group consisting of meta- and para-position NHR' groups wherein R' is lower acyl, and the nontoxic salts and lower alkyl esters thereof. The invention also includes methods of preparing compounds of the class described.

Among the objects of this invention may be mentioned the provision of new compounds which are iodophenylalkanesulfonic acid derivatives; the provision of compounds of the type indicated which are useful intermediates for the preparation of compounds for use in X-ray diagnosis; the provision of improved contrast media for X-ray diagnosis; and the provision of methods for preparing compounds of the class described. Other objects and features will be in part apparent and in part pointed out hereinafter.

The invention accordingly comprises the products and methods hereinafter described, the scope of the invention being indicated in the following claims.

The present invention is directed to the novel iodophenylalkanesulfonic acids of the general formula:

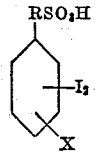

where R is a lower alkylene radical selected from the group consisting of methylene, polymethylene, substituted methylene and substituted polymethylene and X is a substituent selected from the group consistting of meta- and para-positioned NHR' groups wherein R' is lower acyl, and the nontoxic salts and lower alkyl esters thereof. The new compounds have a number of interesting and useful properties. For example, they have a high content of stable, organically bound iodine. The salts are moderately to highly soluble in water. The novel aminoiodophenylalkanesulfonic acids are particularly useful as intermediates for the preparation of more complex derivatives; the alkanamidoiodophenylalkanesulfonic acids and their salts and esters are particularly useful as contrast agents for roentgenography. For example, the soluble salts of the alkanamidoiodophenylalkanesulfonic acids are useful for visualizing the kidney pelvis, ureters and urinary bladder.

The novel aminoiodophenylalkanesulfonic acids of the present invention may be conveniently prepared by iodinating the corresponding aminophenylalkanesulfonic acids with a slight excess of iodine monochloride. The amino group may then be acylated with the appropriate acid chloride to produce the corresponding alkanamidoiodophenylalkanesulfonic acid. The salts and esters may be made from the corresponding acids by conventional means. The aminophenylalkanesulfonic acids used as starting materials are readily prepared from commercially available materials by means well known to the art.

The following examples illustrate the invention.

EXAMPLE 1

*5-amino-2,4-diiodo-alpha-toluenesulfonic acid*

A solution of iodine monochloride (75 g., in 75 ml. of concentrated hydrochloric acid) was added with rapid stirring to a solution of 3-amino-alpha-toluenesulfonic acid (41 g.) in diluted hydrochloric acid (20 ml. of concentrated acid in 1000 ml. of water). The reaction mixture was stirred at room temperatures for 2½ hours and then allowed to stand overnight. The unreacted iodine monochloride was reduced with dilute sodium bisulfite solution and the mixture was filtered. The cake was washed with water and then dissolved in dilute sodium hydroxide solution, with warming. The solution was cooled and the sodium salt precipitated and was filtered off. The salt was dissolved in hot water and 5-amino-2,4-diiodo-alpha-toluenesulfonic acid was precipitated by the addition of dilute hydrochloric acid. The product was filtered and washed with water and denatured alcohol. Yield 60 g. (62.5%). Calculated for $C_7H_7I_2NO_3S$: I, 57.8%; neutral equivalent, 439. Found: I, 57.0%. N.E., 435.

EXAMPLE 2

*Sodium salt of 5-amino-2,4-diiodo-alpha-toluenesulfonic acid*

5-amino-2,4-diiodo-alpha-toluenesulfonic acid (10 g.) was slurried in water (50 ml.) and dilute sodium hydroxide solution was added dropwise until the acid dissolved and the solution was neutral. The solution was chilled, and the salt was filtered off and recrystallized from water (15 ml.) Yield of sodium 5-amino-2,4-diiodo-alpha-toluenesulfonate, 6 g.

EXAMPLE 3

*5-acetamido-2,4-diiodo-alpha-toluenesulfonic acid*

Acetyl chloride (44.5 g.) and dry pyridine (1 ml.) were added, with stirring, to a suspension of 5-amino-2,4-diiodo-alpha-toluenesulfonic acid (25 g.) in toluene (250 ml.). The mixture was stirred and heated under reflux for 12 hours, then filtered. Yield 22 g. (80%). A sample was purified by suspending a portion (18 g.) in water and neutralizing it with sodium hydroxide. The sodium salt was filtered off and dissolved in water and the solution was acidified to precipitate 5-acetamido-2,4-diiodo-alpha-toluenesulfonic acid (6.5 g.). Calculated for $C_9H_9I_2NO_4S$: N.E., 481. Found: 472.

EXAMPLE 4

*Sodium salt of 5-acetamido-2,4-diiodo-alpha-toluenesulfonic acid*

The sodium salt of 5-acetamido-2,4-diiodo-alpha-toluenesulfonic acid was prepared by neutraliizng an aqueous slurry of the acid with sodium hydroxide solution. When the solution was chilled the sodium salt crystallized.

It is soluble to the extent of approximately 19.3 g./100 ml. of water at 25° C. Calculated for $C_9H_8I_2NO_4SNa$: I, 50.5%. Found: I, 49.0%.

EXAMPLE 5

*N-methylglucamine salt of 5-acetamido-2,4-diiodo-alpha-toluenesulfonic acid*

5-acetamido-2,4-diiodo-alpha-toluenesulfonic acid (6.5 g., 0.0135 mole) and N-methylglucamine (2.64 g., 0.0135 mole) were mixed with a little water and the mixture was then diluted to 30.4 ml. The resulting solution of the N-methylglucamine salt of 5-acetamido-2,4-diiodo-alpha-toluenesulfonic acid had a pH of 7.5. The solubility of the salt is greater than 54 g./100 ml. of water at 25° C.

EXAMPLE 6

*4-amino-3,5-diiodo-alpha-toluensulfonic acid*

A solution of iodine monochloride (158 g.) in concentrated hydrochloric acid (158 ml.) was added rapidly with stirring to a mixture of 4-amino-alpha-toluenesulfonic acid (89.0 g.), water (1500 ml.) and concentrated hydrochloric acid (30 ml.). The reaction mixture was stirred for 1½ hours at 50° C., then the unreacted iodine monochloride was reduced with dilute sodium bisulfite solution. The system was chilled and filtered, and the crude product was washed with water then recrystallized from boiling water (700 ml.). Yield of 4-amino-3,5-diiodo-alpha-toluenesulfonic acid, 102 g. (50% of theory). Calculated for $C_7H_7I_2NO_3S$: N.E., 439. Found: N.E., 435.

EXAMPLE 7

*Sodium salt of 4-amino-3,5-diiodo-alpha-toluenesulfonic acid*

Crude 4-amino-3,5-diiodo-alpha-toluenesulfonic acid (10 g.) was dissolved in 100 ml. of hot water, and the solution was filtered and neutralized with dilute sodium hydroxide solution. The solution was chilled and filtered to give 6 g. of salt. Concentration of the filtrate gave an additional 1 g. of salt. The salt was redissolved in water and the solution treated with decolorizing carbon, after which 4 g. of sodium 4-amino-3,5-diiodo-alpha-toluenesulfonate separated as crystals. It solubility is approximately 8.6 g./100 ml. of water at 25° C.

EXAMPLE 8

*N-methylglucamine salt of 4-amino-3,5-diiodo-alpha-toluenesulfonic acid*

A solution of the N-methylglucamine salt of 4-amino-3,5-diiodo-alpha-toluenesulfonic acid was prepared by neutralizing a suspension of the acid with N-methylglucamine. The solubility of the N-methylglucamine salt of 4-amino-3,5-diiodo-alpha-toluenesulfonic acid is greater than 76.5 g./100 ml. of water at 25° C.

EXAMPLE 9

*4-acetamido-3,5-diiodo-alpha-toluenesulfonic acid*

Acetyl chloride (58.5 g.) and pyridine (2.0 ml.) were added to a mixture of 4-amino-3,5-diiodo-alpha-toluenesulfonic acid (33.0 g.) and toluene (300 ml.). The mixture was stirred and heated under reflux for 8 hours, chilled, and filtered. The cake was washed with toluene to give 33.5 g. of crude product. The solid was dissolved in water and passed through two columns of cation exchange resin [sold under the trade designation Amberlite IR–120(H)] to remove pyridine. The solution from the cation exchange column was concentrated to a viscous oil and treated with concentrated hydrochloric acid. When this was stirred and warmed a solid formed. The mixture was chilled and the solid filtered off and dried for 2 days at 50° C. Yield of 4-acetamido-3,5-diiodo-alpha-toluenesulfonic acid (hemihydrate), 18.0 g. (49%). Calculated for $C_9H_9I_2NO_4S \cdot \frac{1}{2}H_2O$: I, 52.7%; N.E., 490. Found: I, 51.0%; N.E., 490.

EXAMPLE 10

*N-methylglucamine salt of 4-acetamido-3,5-diiodo-alpha-toluenesulfonic acid*

4-acetamido-3,5-diiodo-alpha-toluenesulfonic acid hemihydrate (14.2 g., 0.0291 mole) and N-methylglucamine (5.7 g., 0.0292 mole) were dissolved in sufficient water to make a volume of 40 ml. This solution was sterilized by heating it at 15 lbs. steam pressure for 15 minutes. The resulting solution contained approximately 50% (w./v.) of the N-methylglucamine salt of 4-acetamido-3,5-diiodo-alpha-toluenesulfonic acid. The solubility of the salt is approximately 55 g./100 ml. of water at 25° C.

EXAMPLE 11

*Sodium beta-(4-nitrophenyl)-ethanesulfonate*

Beta-(4-nitrophenyl)-ethyl bromide (50 g.) was added to a solution of sodium sulfite (27.4 g.) in water (275 ml.) and the mixture was stirred vigorously and heated under reflux for 3 hours. During this time the oily phase disappeared. The solution of sodium beta-(4-nitrophenyl)-ethanesulfonate was cooled to room temperature and filtered to remove a small amount of insoluble material. This filtrate was then used in the following example.

EXAMPLE 12

*Beta-(4-aminophenyl)-ethanesulfonic acid*

The solution of sodium beta-(4-nitrophenyl)-ethanesulfonate from the preceding example was hydrogenated at 25–40 p.s.i. pressure, using as a catalyst 5 g. of 5% palladium on charcoal. The solution had absorbed the theoretical amount of hydrogen after 11 hours. The solution was warmed and filtered hot to remove the catalyst, after which it was concentrated under reduced pressure. The solution was then acidified with hydrochloric acid to precipitate beta-(4-aminophenyl)-ethanesulfonic acid, chilled, and filtered. Yield, 42.0 g. [95%, based on the beta-(4-nitrophenyl)-ethyl bromide]. This product was used in the following example without further purification.

EXAMPLE 13

*Beta-(4-amino-3,5-diiodophenyl)-ethanesulfonic acid*

A solution of iodine monochloride (64.0 g.) in concentrated hydrochloric acid (64 ml.) was added all at once to a rapidly stirred suspension of beta-(4-aminophenyl)-ethanesulfonic acid (38.0 g.) in water (1000 ml.) and concentrated hydrochloric acid (30 ml.). The suspension was stirred rapidly and after a short time the reaction mixture darkened and most of the solid dissolved. The system was heated to 50° C. and a tan precipitate soon formed. There was no unreacted iodine monochloride after 2 hours' stirring at 50° C. The suspension was then chilled and filtered. The product, beta-(4-amino-3,5-diiodophenyl)-ethanesulfonic acid, was washed with water and recrystallized from 300 ml. of boiling water, the solution being treated with decolorizing carbon. Yield of beta-(4-amino-3,5-diiodophenyl)-ethanesulfonic acid, 50.0 g. (58.5%). Calculated for $C_8H_9I_2NO_3S$: N.E., 453.1. Found: 455.

EXAMPLE 14

*Beta-(4-acetamido-3,5-diiodophenyl)-ethanesulfonic acid*

Acetyl chloride (30 ml.) and dry pyridine (2.0 ml.) were added with stirring to a suspension of beta-(4-amino-3,5-diiodophenyl)-ethanesulfonic acid (35.0 g.) in toluene (300 ml.). The mixture was stirred and heated under reflux for 5 hours but at no time did the solid dissolve. (After the mixture was heated 2 hours the solvent was light brown and after 4 hours, light red.) The mixture was set aside overnight, then filtered and washed with toluene. The brown, wet cake weighed 39.0 g. A sample was found to be very soluble in water.

Much of the color was removed by slurrying the product with warm denatured alcohol and filtering the slurry. Yield, 30.0 g. This was dissolved in the least amount of hot water, treated with decolorizing carbon and filtered. The sodium salt of the product was precipitated with dilute sodium hydroxide, filtered off and redissolved in a large volume of hot water. A strong odor of pyridine was evident. The hot solution was passed through a steam-jacketed column of cation exchange resin (50 g.) [sold under the trade designation Amberlite IR–120(H)]. The column was washed with hot water, the liquors combined, treated with decolorizing carbon, and concentrated to a viscous brown oil. Addition of concentrated hydrochloric acid caused the formation of a dark, cream-colored solid. The slurry was chilled and filtered. Yield, 21 g. Since it appeared that some sodium salt was still present, the solid was again dissolved in warm water and passed through a fresh column of the cation exchange resin. The eluate was treated with decolorizing carbon, filtered and evaporated to dryness. After drying in a steam chest the product, beta-(4-acetamido-3,5-diiodophenyl)-ethanesulfonic acid, weighed 17 g. Yield, 44.5%, M.P. 227.1–229.1° C. (dec.). Calculated for $C_{10}H_{11}I_2NO_4S$: N.E., 495.1. Found: N.E., 493.

EXAMPLE 15

*N-methylglucamine salt of beta-(4-acetamido-3,5-diiodophenyl)-ethanesulfonic acid*

A solution of beta-(4-acetamido-3,5-diiodophenyl)-ethanesulfonic acid (14.4 g.) in hot water (50 ml.) was treated with a little decolorizing carbon and filtered. The filtrate was concentrated to 25 ml., neutralized with N-methylglucamine, and diluted to 40 ml. The resulting solution contained 50% (w./v.) of the N-methylglucamine salt of beta-(4-acetamido-3,5-diiodophenyl)-ethanesulfonic acid.

In addition to the compounds specifically disclosed above, other useful compounds of the invention may be prepared by analogous methods or other methods well known to those skilled in the art. Such other compounds include, for example, 5-propionamido-2,4-diiodo-alpha-toluenesulfonic acid and 4-propionamido-3,5-diiodo-alpha-toluenesulfonic acid, as well as esters of the various acids, such as the ethyl and propyl esters. Also, it will be understood that other customary salts may be conveniently prepared and employed in the practice of the invention.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

I claim:

1. A compound selected from the group consisting of compounds having the formula:

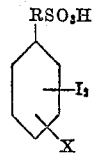

where R is a lower alkylene radical selected from the group consisting of methylene, polymethylene, substituted methylene and substituted polymethylene and X is a substituent selected from the group consisting of meta- and para-positioned NHR′ groups wherein R′ is lower acyl, and the nontoxic salts and lower alkyl esters thereof.

2. 4-acetamido-3,5-diiodo-alpha-toluenesulfonic acid and the nontoxic salts and lower alkyl esters thereof.

3. Beta-(4-acetamido-3,5-diiodophenyl)-ethanesulfonic acid and the nontoxic salts and lower alkyl esters thereof.

4. 5-acetamido-2,4-diiodo-alpha-toluenesulfonic acid and the nontoxic salts and lower alkyl esters thereof.

References Cited in the file of this patent

UNITED STATES PATENTS 2,705,726  Archer _____ Apr. 5, 1955

OTHER REFERENCES

Barnett et al.: Journal Chemical Society (London), page 202–204 (3 pages), 1947.